US010598249B2

United States Patent
Saley

(10) Patent No.: US 10,598,249 B2
(45) Date of Patent: Mar. 24, 2020

(54) JOINT CUSHIONING SYSTEM

(71) Applicant: Neil Saley, Backus, MN (US)

(72) Inventor: Neil Saley, Backus, MN (US)

( * ) Notice: Subject to any disclaimer, the term of this patent is extended or adjusted under 35 U.S.C. 154(b) by 105 days.

(21) Appl. No.: 15/897,780

(22) Filed: Feb. 15, 2018

(65) Prior Publication Data

US 2019/0249746 A1 Aug. 15, 2019

(51) Int. Cl.
| | |
|---|---|
| F16F 13/30 | (2006.01) |
| A41D 13/015 | (2006.01) |
| A41D 1/00 | (2018.01) |
| A41D 13/05 | (2006.01) |
| A41B 9/12 | (2006.01) |
| F16F 13/06 | (2006.01) |
| A41D 31/28 | (2019.01) |

(52) U.S. Cl.
CPC .............. *F16F 13/305* (2013.01); *A41B 9/12* (2013.01); *A41D 1/002* (2013.01); *A41D 13/015* (2013.01); *A41D 13/0506* (2013.01); *A41D 31/28* (2019.02); *F16F 13/06* (2013.01); *A41D 2300/20* (2013.01); *F16F 2222/06* (2013.01); *F16F 2224/0225* (2013.01); *F16F 2224/045* (2013.01); *F16F 2228/066* (2013.01); *F16F 2230/08* (2013.01); *F16F 2230/18* (2013.01); *F16F 2236/045* (2013.01)

(58) Field of Classification Search
CPC ...... F16F 13/305; F16F 13/06; F16F 2222/06; F16F 2224/0225; F16F 2228/066; F16F 2236/045; A41D 31/28
USPC .................................................... 267/140.15
See application file for complete search history.

(56) References Cited

U.S. PATENT DOCUMENTS

| | | | | |
|---|---|---|---|---|
| 9,205,794 | B1* | 12/2015 | Farooq | B60R 19/18 |
| 2002/0007509 | A1* | 1/2002 | Kamada | A41D 13/0158 2/455 |
| 2002/0188997 | A1* | 12/2002 | Lyden | A41D 13/0153 2/22 |
| 2006/0033312 | A1* | 2/2006 | Barvosa-Carter | B60R 21/04 280/728.1 |
| 2008/0303326 | A1* | 12/2008 | Booth | B60N 2/80 297/284.2 |
| 2013/0023720 | A1* | 1/2013 | Solomon | A61N 2/004 600/15 |
| 2013/0298914 | A1* | 11/2013 | Shibaya | A41D 13/015 128/846 |
| 2013/0310628 | A1* | 11/2013 | Chisena | A61B 17/1325 600/15 |

* cited by examiner

*Primary Examiner* — Robert A. Siconolfi
*Assistant Examiner* — San M Aung

(57) ABSTRACT

A joint cushioning system includes a pad of a foam material which is resiliently compressible. The pad has an outer surface, an inner surface, an upper edge, a lower edge, a first lateral edge and a second lateral edge. A magnetorheological fluid impregnates the foamed material. The magnetorheological fluid is configured to be alternated between a first state wherein the foamed material is bendable and compressible and a second state wherein the magnetorheological fluid forms rigid columns within the foamed material such that the foamed material is less bendable and compressible. An actuating system is mounted on the pad and is in operational communication with magnetorheological fluid. The actuating system actuates the magnetorheological fluid from the first state to the second state when a condition has been met.

12 Claims, 3 Drawing Sheets

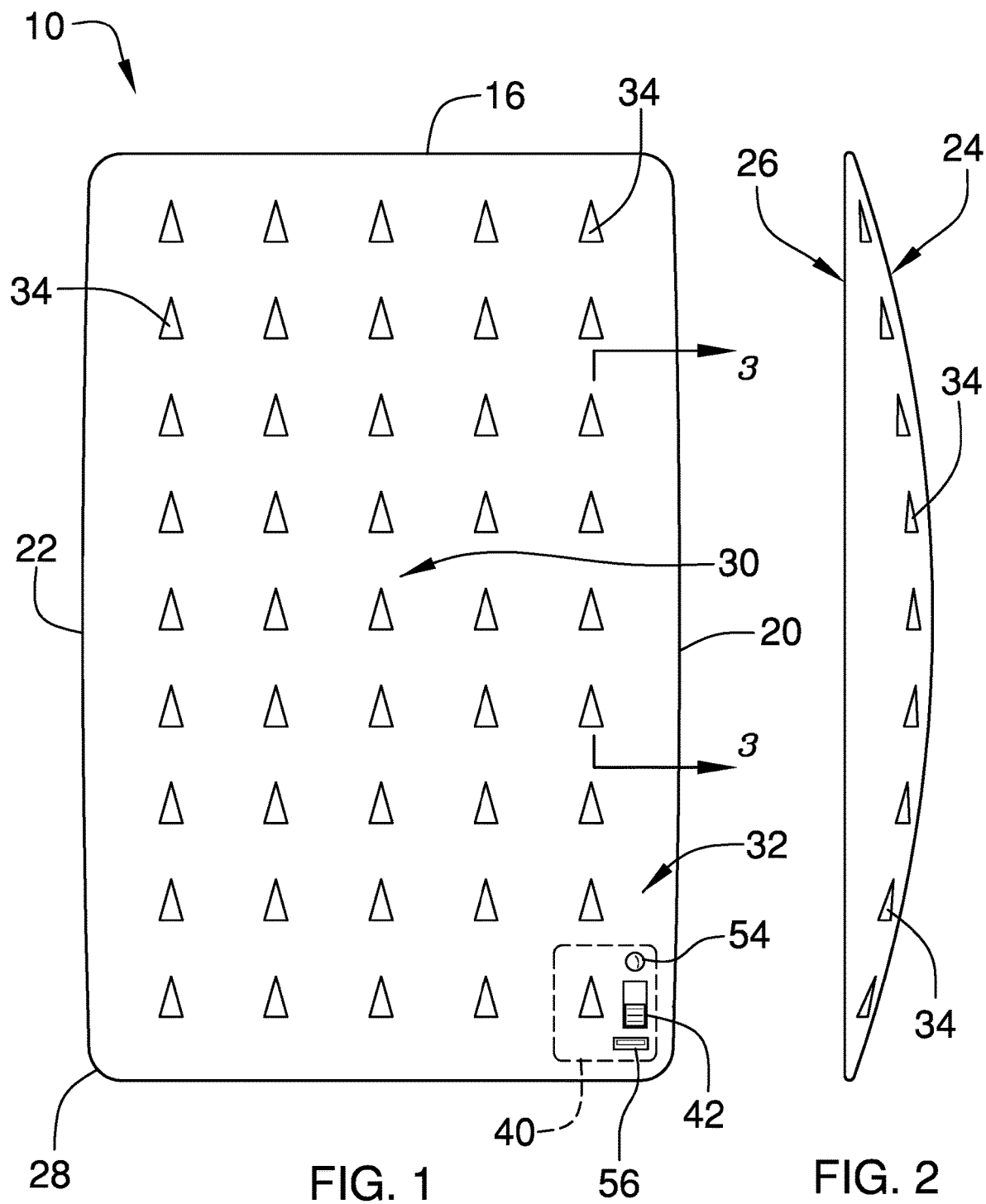

JOINT CUSHIONING SYSTEM

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to hip cushion assemblies and more particularly pertains to a new hip cushion assembly for placement over a person's hip and which becomes more rigid during a fall to protect the hip from an impact resulting from the fall.

BRIEF SUMMARY OF THE INVENTION

An embodiment of the disclosure meets the needs presented above by generally comprising a pad of a foam material which is resiliently compressible. The pad has an outer surface, an inner surface, an upper edge, a lower edge, a first lateral edge and a second lateral edge. A magnetorheological fluid impregnates the foamed material. The magnetorheological fluid is configured to be alternated between a first state wherein the foamed material is bendable and compressible and a second state wherein the magnetorheological fluid forms rigid columns within the foamed material such that the foamed material is less bendable and compressible. An actuating system is mounted on the pad and is in operational communication with magnetorheological fluid. The actuating system actuates the magnetorheological fluid from the first state to the second state when a condition has been met.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 1 is a top view of a joint cushioning system according to an embodiment of the disclosure.

FIG. 2 is a side view of an embodiment of the disclosure.

DETAILED DESCRIPTION OF THE INVENTION

Figure 3:
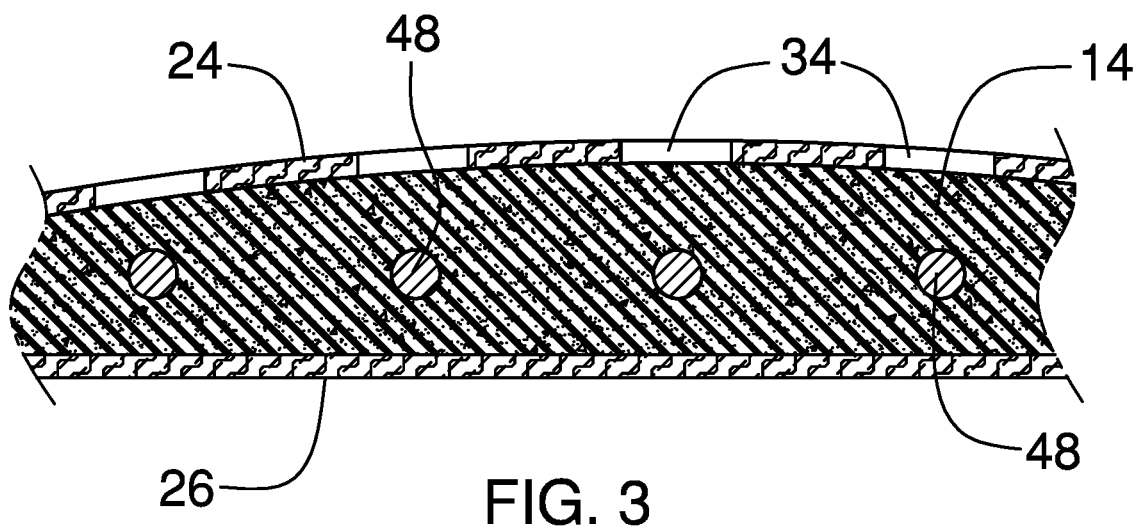
FIG. 3 is a cross-sectional view of an embodiment of the disclosure taken along line 3-3 of FIG. 2.
Figure 4:
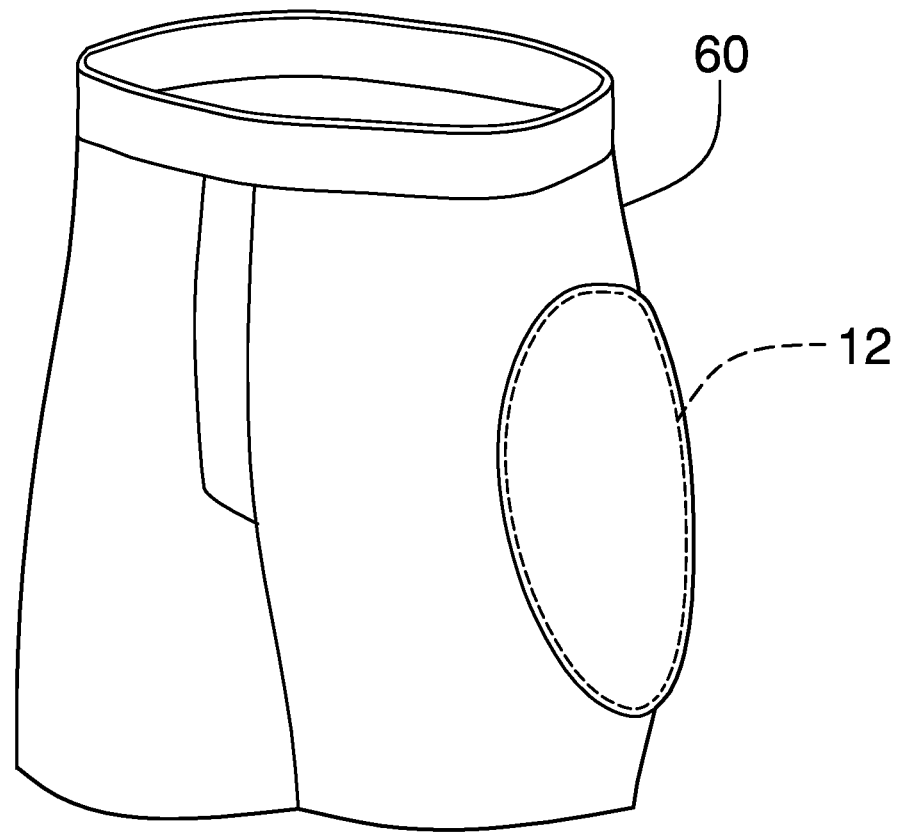
FIG. 4 is a perspective view of a pad holding garment of an embodiment of the disclosure.
Figure 5:
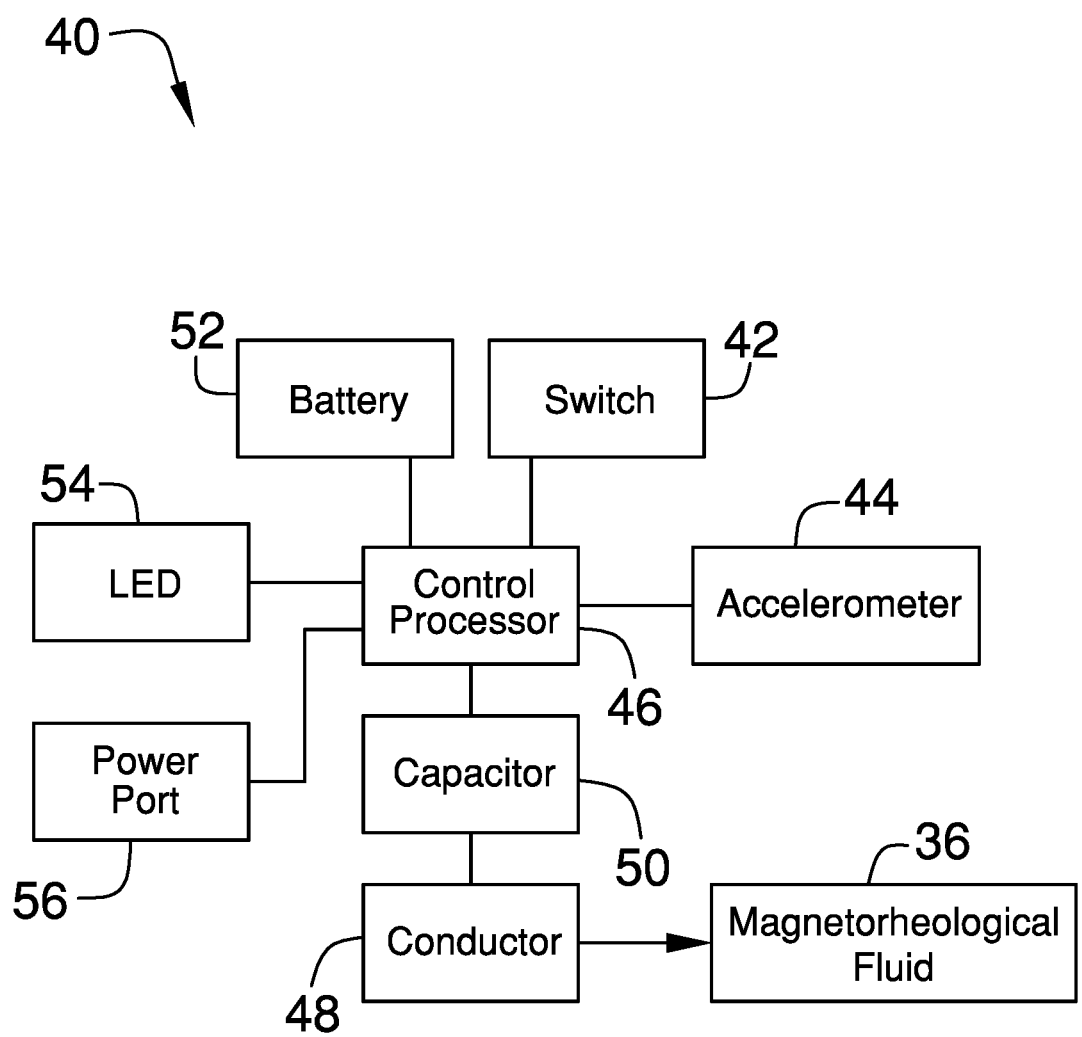
FIG. 5 is a schematic view of an embodiment of the disclosure.

With reference now to the drawings, and in particular to FIGS. 1 through 5 thereof, a new hip cushion assembly embodying the principles and concepts of an embodiment of the disclosure and generally designated by the reference numeral 10 will be described.

As best illustrated in FIGS. 1 through 5, the joint cushioning system 10 generally comprises a pad 12 of foamed material 14, which is also known as a cellular solid. The foamed material 14 is a porous, resiliently compressible material and may be selected from any one of well-known foamed elastomeric materials used in the manufacturing of or used in joint padding, particularly of the type used to cushion the hip area. Alternatively, the foamed material 14 may be comprised of a gel material held between outer and inner layers. The pad 12 includes an upper edge 16, a lower edge 18, a first lateral edge 20 and a second lateral edge 22. The upper 16 and lower 18 edges may each have a length between 4.0 inches and 6.0 inches while the first 20 and second 22 lateral edges may each have a height between 5.0 inches and 8.0 inches. A thickness of the pad 12 from an outer surface 24 to an inner surface 26 may vary and in particular may increase from a perimeter edge 28 to a central area 30. Generally, the pad 12 will have a thickness adjacent to the perimeter edge 28 of less than 0.4 inches and a thickness near the central area 30 of the pad being greater than 0.70 inches. It should be understood that the length, width and thickness of the pad 12 may be altered depending on the size of the person using the pad. While the pad 12 may be formed of a unitary structure, it may also be formed of a plurality of layers of foamed material 14. The pad 12 may further include a plurality of apertures 34 extending therein for the dissipation of heat. The pad 12 is preferably comprised of a soil and moisture resistant material to allow the pad 12 to be easily cleaned between uses.

A magnetorheological fluid 36, which may be characterized as a smart fluid, impregnates the foamed material 14. This may thereafter be defined as magnetorheological foam or MR foam. The foamed material 14 may be open cell material with the magnetorheological fluid 36 added secondarily or embedded within the foam material 14 during the manufacturing of the foamed material 14. Alternatively, the magnetorheological fluid 36 may be microencapsulated and embedded into the foamed material 14. The magnetorheological fluid 36 is configured to be alternated between a first state wherein the foamed material 14 is bendable and a second state wherein the magnetorheological fluid forms rigid columns and/or a matrix of columns within the foamed material 14 such that a compressibility of the foamed material is altered to reduce its compressibility and its flexibility. The degree to which compressibility and flexibility are decreased may be adjusted depending on input factors and structural factors as needed. Thus, the second state may include the foamed material 14 becoming non-bendable, non-compressible and rigid though some compressibility under normal impact conditions may be favorable. The magnetorheological fluid 36 may be any type of material whose structure is altered from a fluid or malleable one to a rigid one when either an electric field or a magnetic field is applied to the MR foam.

Generally, the magnetorheological fluid 36 may be classified as an electroactive polymer. Electroactive polymers include a class of materials that organize their orientation and relative positions when subjected to magnetic fields or low level electric fields. With their orientations aligned and positioned and retained in a static condition relative to each other, the electroactive polymers, or magnetorheological iron particles, will form rigid columns within the foamed material. This change occurs on the order of milliseconds and is rapidly reversible when the magnetic or electric field is discontinued.

In order to form a more rigid structure to prevent the electroactive polymers from moving in sheets relative to one another when the magnetorheological fluid 36 is in the second state, the magnetorheological fluid 36 may be arranged in a pattern within the foamed material 14. These patterns may take one or multiple ones of many forms. For example, the patterns may include a web pattern, a diamond lattice pattern, helical and double helix shapes and the like.

An actuating system 40 is mounted on the pad 12 and is in operational communication with magnetorheological fluid 36. More particularly, this would include, for example, circuitry within the MR foam. The actuating system 40 actuates, or changes, the magnetorheological fluid 36 from the first state to the second state when a condition has been met and the actuating system 40 actuates the magnetorheological 36 fluid from the second state to the first state when a deactivation event occurs. The deactivation event may include a predetermined amount of time, removal of a power source, complete capacitor (or super capacitor) discharge, pressing of a power switch 42, remote activation or other input mechanisms.

The condition is met when the actuating system 40 detects a threshold acceleration that has been surpassed by the pad 12. To that end, the actuating system 40 includes an accelerometer 44 that is mounted on the pad 12 and detects the amount of acceleration to which the pad 12 is being subjected. Typically, the threshold acceleration will be that which indicates a fall is occurring. This threshold may be varied but will typically occur when the accelerometer detects that the pad 12 is in a free falling state wherein the accelerometer 44 detects less than 0.50 g (less than ½ the gravitational acceleration constant of 9.81 m/s$^2$). The condition may require a time component as well, such as detecting less than 0.50 g for a sustained time period of at least 0.10 seconds. Additionally, conventional accelerometers, such as those found in cellular phones, can also measure the angle at which the accelerometer is moving. Consequently, the accelerometer 44 may detect that a fall is taking place beyond the threshold acceleration and that the angle indicates the outer surface of the pad 12 is generally being directed toward a ground surface, i.e. that an impact is imminent and that the pad 12 will be between a person's hip and the ground surface. This signals the actuating system 40 that the condition has been met and the actuating system 40 will actuate the MR foam from the first condition to the second condition. While a single accelerometer 44 may be utilized, the actuating system 10 may include a plurality of accelerometers 44 to more accurately measure movement of the pad 12 and may include angle detectors that are discrete with respect to the accelerometer 44. Generally a person will be wearing two pads 12 with one being located on each hip. By having data describing the angle of the fall, the pad 12 positioned opposite the fall will not be activated to the second state as it will not be shielding that hip section from impact.

A control processor 46 is in communication with the accelerometer 44 and may be either electrically or wirelessly in communication with the accelerometer 44. A conductor 48, which is an electrical conductor, and a capacitor 50, are operationally coupled to the control processor 46. The conductor 48 is operationally coupled to the magnetorheological fluid 36 and in general this will entail being in close proximity to the MR foam and may be embedded within the MR foam such that it will subject the MR foam to a magnetic field or electric discharge when energized. Multiple capacitors 50 may be arranged in parallel circuits to provide more current to multiple coils of conductors positioned within the MR foam. The conductor 48 is not energized, or is turned off to cause the magnetorheological fluid 36 to enter the first state and energized, or turned on, by the capacitor(s) 50 to cause the magnetorheological fluid 36 to enter the second state. If capacitors(s) 50 are utilized, once they are fully discharged, the MR foam will return to the first state. The actuating system 40 is typically retained in a powered on state though a switch 42, either mechanically mounted on pad or in remote communication with the control processor 46, may be utilized to turn the actuating system 40 on or off.

Depending on the type of magnetorheological fluid 36 to be used within the foamed material, the conductor 48 may create an electric field or a magnetic field when the conductor is energized. The conductor 48 may include insulated wires forming coils extending through the foamed material. The coils may themselves be contained within an elastomeric material in a series of round coils making a web like pattern to protect the insulated wires from impact damage. This web of coils may also be placed immediately adjacent to but not within the foamed material.

During usage of the system 10, the control processor 46 receives data from the accelerometer 44 and energizes the conductor 48 when the condition is met. The electrons flow through the conductor 48, or coil, to create a magnetic field and therefore induction of a magnetic field to cause the foamed material 14 to rapidly enter the second state to become more rigid and thereby, with respect to a person's hips, dissipate impact forces away from the femoral neck and lower pelvic rings to the iliac crest.

A power source, or battery 52, is electrically coupled to the control processor 46 and the conductor 48. The power source may comprise a rechargeable battery. A charging port 56, or power port, is electrically coupled to the battery 52 to allow for recharging thereof with a conventional power plug. Alternatively, the battery 52 may be charged by magnetic induction charging. A charge status light 54, such as an LED, may be mounted on the pad and in electrical communication with the battery 52 to indicate the power status of the battery 52 to a user of the pad 12.

In use, the system 10 is worn against a person's hips and may be placed within conventional garments 60 having pockets positioned therein which are specifically designed for holding hip pads. The pad 12 of the system 10 will have a thinner profile than a conventional hip pad since its flexibility can be altered as needed. Thus, the pad 12 will be more comfortable for sleeping on and therefore will more likely to be used as directed. The pad 12 may include an outer region 32 adjacent to the perimeter edge 28 which surrounds a central region 30. The central region 30 may be more saturated with magnetorheological fluid 36 than the outer region 32 so that in the second state the central region 30 has more rigidity than the outer region 32. For example, the outer region 32, comprising about 1.0 to 2.0 inches inward from the perimeter edge may have no greater than a 10% saturation while the central region 30 has at least 15% saturation of magnetorheological fluid. By varying the saturation, different levels of resiliency are achieved. Here, by increasing the saturation within the central region 30, the central region 30 will become more rigid and deflect the impact forces outwardly toward the outer region 32. This may also be achieved by creating layers of foamed materials 14 wherein different layers include different saturation levels. Alternatively, or in addition to changing the saturation, the magnetic field may differ from one region to the next to increase or decrease the rigidity in selected areas as needed.

The pad 12 itself is generally rectangular shaped with rounded corners. The pad 12 will like directly over the lateral aspect of the hip and have a longitudinal axis (extending through the top 16 and bottom 18 edges) that extends superiorly from the iliac crest inferiorly past the less trochanter of the femur. Because the pad 12 is allowed to be thinner than a conventional protective pad, it can also be larger without causing discomfort to the wearer. This larger size, as stated above, will help reduce hip fracture occurrence. The central region 30 is thicker and the pad 12 thickness tapers downwardly from the central region 30 to the perimeter edge 28 for comfort while retaining its thickest portion over the greater trochanter of the femur.

Should a person fall while the pad(s) is being utilized the condition will be met and electrons will flow from the capacitor 50 and through the conductor 48, or wires, to induce a magnetic field. This causes the foamed material 14 to enter the second state to prevent to absorb the impact from a fall and dissipate such outwardly from the impact location. Upon the occurrence of the deactivation event, the MR foam returns to the first state. It should be understood that such a pad 12 may be used for other areas of the body, including knees, elbows, wrists and head, however it has been found that the pad of the present invention has a structure and function which will particularly allow it to help prevent hip fractures in elderly patients. Moreover, it should be understood that generally the pad 12 will perform the function of impact absorption much better than a traditional hip pad as the pad 12 of the current invention may be tailored to the particular body shape and weight of the user. In particular, the magnetic field strength or the saturation of the magnetorheological fluid 36 saturation may be altered as desired. Furthermore, the actuating system 40 may be programmed to vary the strength of the magnetic field in accordance with the magnitude of acceleration.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A protective cushioning assembly configured to be positioned over a person's hip to protect the hip during a fall, said assembly comprising:
    a pad being comprised of a foam material, said foam material being resiliently compressible, said pad having an outer surface, an inner surface, an upper edge, a lower edge, a first lateral edge and a second lateral edge;
    a magnetorheological fluid impregnating said foamed material, said magnetorheological fluid being configured to be alternated between a first state wherein said foamed material is bendable and compressible and a second state wherein said magnetorheological fluid forms rigid columns within said foamed material such that said foamed material is less bendable and compressible; and
    an actuating system being mounted on said pad and being in operational communication with magnetorheological fluid, said actuating system actuating said magnetorheological fluid from said first state to the second state when said actuating system detects a threshold acceleration has been surpassed by said pad, said actuating system including
        an accelerometer mounted on said pad and detecting an amount of acceleration to which said pad is being subjected, said condition including accelerometer detecting when said pad is in a free falling state,
        a control processor being in communication with said accelerometer, and
        a conductor being operationally coupled to said control processor, said conductor being operationally coupled to the magnetorheological fluid, said control processor electrifying said conductor to actuate said magnetorheological fluid to said second state when said accelerometer detects said pad is in said free falling state.

2. The protective cushioning assembly according to claim 1, wherein said upper and lower edges each have a length between 4.0 inches and 6.0 inches, each of said first and second lateral edges having a length between 5.0 inches and 8.0 inches.

3. The protective cushioning assembly according to claim 1, wherein said pad has a thickness that decreases from a central region of said pad to a perimeter edge of said pad.

4. The protective cushioning assembly according to claim 3, wherein said perimeter edge has a thickness of less than 0.40 inches, said central region having a thickness being greater than 0.70 inches.

5. The protective cushioning assembly according to claim 1, wherein said central region is saturated to at least 15% with said magnetorheological fluid, an outer region between said central region and a perimeter edge of said pad being saturated to no greater than 10% with said magnetorheological fluid.

6. The protective cushioning assembly according to claim 1, wherein said actuating system further includes a capacitor being electrically coupled to said conductor.

7. The protective cushioning assembly according to claim 1, wherein said actuating system further includes a battery being electrically coupled to said control processor.

8. The protective cushioning assembly according to claim 1, wherein said actuating system further includes a switch being operationally coupled to said control processor and being actuated to an on position to turn said control processor on or actuated to an off position to turn said control processor of.

9. The protective cushioning assembly according to claim 7, wherein said actuating system further includes a charge status light being electrically coupled to said battery.

10. The protective cushioning assembly according to claim 9, wherein said actuating system further includes a power port being electrically coupled to said battery.

11. The protective cushioning assembly according to claim 7, wherein said actuating system further includes a power port being electrically coupled to said battery.

12. A protective cushioning assembly configured to be positioned over a person's hip to protect the hip during a fall, said assembly comprising:

a pad being comprised of a foam material, said pad having an outer surface, an inner surface, an upper edge, a lower edge, a first lateral edge and a second lateral edge, said upper and lower edges each having a length between 4.0 inches and 6.0 inches, each of said first and second lateral edges having a length between 5.0 inches and 8.0 inches, said pad having a thickness that decreases from a central region of said pad to a perimeter edge of said pad, said perimeter edge having a thickness of less than 0.40 inches, said central region having a thickness being greater than 0.70 inches, said pad having a rectangular shape having rounded corners, said pad having a plurality of apertures extending therein, said foam material being porous and resiliently compressible;

a magnetorheological fluid impregnating said foamed material, said magnetorheological fluid being configured to be alternated between a first state wherein said foamed material is bendable and compressible and a second state wherein said magnetorheological fluid forms rigid columns within said foamed material such that said foamed material is less bendable and compressible, said central region being saturated to at least 15% with said magnetorheological fluid, an outer region between said central region and said perimeter edge being saturated to no greater than 10% with said magnetorheological fluid;

an actuating system being mounted on said pad and being in operational communication with magnetorheological fluid, said actuating system actuating said magnetorheological fluid from said first state to the second state when a condition has been met, said actuating system actuating said magnetorheological fluid from said second state to said first state when a deactivation event occurs;

said condition being met when said actuating system detects a threshold acceleration that has been surpassed by said pad;

said actuating system including:

an accelerometer mounted on said pad and detecting an amount of acceleration to which said pad is being subjected, said condition including accelerometer detecting when said pad is in a free falling state;

a control processor being in communication with said accelerometer;

a conductor being operationally coupled to said control processor, said conductor being operationally coupled to the magnetorheological fluid, said control processor electrifying said conductor to actuate said magnetorheological fluid to said second state when said accelerometer detects said pad is in said free falling state;

a capacitor being electrically coupled to said conductor;

a battery being electrically coupled to said control processor;

a switch being operationally coupled to said control processor and being actuated to an on position to turn said control processor on or actuated to an off position to turn said control processor of;

a charge status light being electrically coupled to said battery; and a power port being electrically coupled to said battery.

* * * * *